3,308,205
THERMOPLASTIC POLYHYDROXYETHER WITH NITRILE RUBBER AND LAMINATES THEREOF
Thomas E. Bugel, Metuchen, N.J., assignor to Union Carbide Corporation, a corporation of New York
No Drawing. Filed Aug. 1, 1963, Ser. No. 299,203
17 Claims. (Cl. 260—837)

This invention relates to thermoplastic polyhydroxyether adhesive compositions which bond with great strength at low temperatures and laminates thereof. More particularly, the invention relates to laminates of thermoplastic polyhydroxyether compositions which develop at low temperatures bond strengths heretofore achieved only at temperatures several hundred Fahrenheit degrees higher.

As the use of thermoplastic polyhydroxyether as an adhesive has widened to include adhesion to a great variety of substrates it has become apparent that the high bonding temperatures used for maximum strength e.g., 600 to 700° F. subtly affected certain substrates. For example, aluminum laminae were sometimes annealed during the bonding operation. It was desirable, therefore, to reduce the bonding temperatures, but importantly, without a sacrifice in final bond strength, and if possible without loss of the other numerous advantageous properties of thermoplastic polyhydroxyether.

It has now been discovered that the bonding temperature required to obtain laminates of maximum bond strength with thermoplastic polyhydroxyether can be lowered by 100 to 200 Fahrenheit degrees and more by the presence of a nitrile rubber in the thermoplastic polyhydroxyether.

It is a significant advantage of the present laminates that substantial improvement in shear and peel strength is obtained without the use of primers being required.

Adhesive compositions have now been found which provide the outstanding bond strengths, creep resistance, and versatility of thermoplastic polyhydroxyether, but which develop maximum bond strength at surprisingly lower temperatures than straight polyhydroxyether, i.e. polyhydroxyether not blended with a nitrile rubber. The thermoplastic polyhydroxyether compositions of the present invention can be applied to adherends from solution as by spraying, dipping, brush flow coating, impregnation or the like; by melt applying as in extrusion coating, powder coating, flame spraying, and fluid bed coating or the like; and importantly by film laminating.

It is significant advantage of the thermoplastic polyhydroxyether compositions herein described as an adhesive bonding material that they are available in the form of a flat sheet or as film on a roll. Some of the advantages gained by use of thermoplastic polyhydroxyether composition films as an adhesive material include:

(1) A single component system, no mixing to form the adhesive
(2) Unlimited shelf life
(3) No liquids to be handled
(4) No volatiles
(5) No priming of the adherend necessary
(6) No prolonged curing cycles
(7) Bonds of great strength obtained
(8) Readily controllable glue line thickness
(9) Absolute freedom from pinholes
(10) Ultra-thin laminates feasible
(11) Lower cost because less material required
(12) No necessity of supporting web for a film adhesive
(13) Thermoplastic films are readily produced by variety of inexpensive means
(14) Reproducible bonding effects; no vagaries due to cure cycles and storage.

There has not been known prior to thermoplastic polyhydroxyether a thermoplastic material possessing the above attributes. In fact, there has not been known a widely adhesive thermoplastic film. Now with the compositions of the present invention the advantages attributes of thermoplastic polyhydroxyether can be taken advantage of with many more substrates such as paper, wood, heat sensitive steels and aluminum.

The thermoplastic polyhydroxyether adhesive compositions herein described lend themselves to coating virtually any surface having any contour. Moreover, a coating of the thermoplastic polyhydroxyether adhesive compositions is in itself a base material or primer to which other materials can be bonded using the thermoplastic polyhydroxyether composition as the adhesive.

Although thermosetting adhesive films are known their properties and advantages do not begin to compare with those of the thermoplastic polyhydroxyether composition adhesive films described herein. Whereas a thermosetting film requires a chemical reaction to bond, the thermoplastic polyhydroxyether adhesive compositions of this invention require only as much temperature and pressure as is necessary to make the composition flow into intimate contact with the adherend. This can be a matter of a few seconds or only a brief fraction of a second. A summary of advantages of thermoplastic polyhydroxyether composition adhesive films over a typical thermosetting resin film, phenolic nitrile, is presented in Table I.

TABLE I.—COMPARISON OF STORAGE, HANDLING, AND APPLICATION CONDITIONS FOR BONDING FILMS

| | Thermosetting | Thermoplastic |
|---|---|---|
| Class | Thermosetting | Thermoplastic. |
| Type of resin | Phenolic nitrile | Polyhydroxyether. |
| Form | Unsupported film, polyethylene liner. | Unsupported film, no liner. |
| Volatile content | Film exposed for 1 hour at 350° F., less than 5% weight loss. | 0 percent. |
| Bond temperature | Minimum 257° F.; 60 min. at 350° F. and 150 p.s.i. recommended to cure. | 300 to 550° F. depending on substrate bonds within in seconds or less at low pressures. |
| Maximum storage | 6 months at less than 40° F. | Indefinite. |

The thermoplastic polyhydroxyether adhesive compositions of the present invention are, as illustrated in Table I, in essentially final chemical form and need only be caused to flow for a moment in order to be activated into bonding to an adherend. Activation is by heating either the substrate and pressing the thermoplatic polyhydroxyether adhesive composition thereagainst or heating the thermoplastic polyhydroxyether adhesive composition in some manner e.g., radiant heating, convection, induction, electrically, ultrasonically, et certera and pressing the adherend against the polymer or a heated particulate adherend can be blown against the thermoplastic polyhydroxyether adhesive composition. The superiority of thermoplastic polyhydroxyether adhesive compositions over other thermoplastics in terms of bond strength is shown in Table II following:

TABLE II

| Thermoplastic | Press Temp., °F. | Dwell Time, Seconds | Average Lap Shear Strength,[1] (p.s.i.) |
|---|---|---|---|
| Polyhydroxyether/ Acrylonitrile-butadiene oligomer:[2] | | | |
| (87.5/12.5) | 450 | 120 | 4240 |
| (92.5/7.5) | 450 | 120 | 3135 |
| Polyhydroxyether | 450 | 120 | 2450 |
| Do | 700 | 40 | 3500 |
| Polystyrene | 700 | 40 | 600 |
| Vinyl Chloride/Vinyl Acetate Copolymer | 500 | 40 | 570 |
| Polyethylene | 700 | 40 | 770 |
| Polyester | 700 | 40 | 870 |
| Vinyl Chloride/Vinyl Acetate/Maleic Acid Copolymer | 600 | 20 | 1060 |

[1] ASTM D-1002.
[2] 33-35% acrylonitrile and containing one carboxyl group (COOH) per 50 carbon atoms.

In general, what is required to adhere the thermoplastic polyhydroxyether adhesive compositions to an adherend is to flux the composition at the interface of the two materials. Fluxing is flow under head and usually pressure and is most easily accomplished by the input of sufficient heat into the area to be bonded. It is to be emphasized that actual flow is not necessary because the polyhydroxyether composition can be activated into bonding without flow as occurs for example in some solution coatings. Generally a short bake at moderate temperatures improves the bond obtained from solution coatings. The use of pressure also assists in obtaining good bonding. Typical of amorphous thermoplastics, polyhydroxyethers have no distinct melting point or a narrow melting range but rather soften over a wide temperature range. At the low end of the softening range heat alone may not be sufficient to flux the resin as it is sufficient at the high end of the range, but a combination of mild heat and pressure will cause the polyhydroxyether compositions to flow.

The terms "structural element" and "structural elements" as used herein refer to an assembly or assemblies of one or more discrete, planar, curvilinear, rectangular, round, or odd shaped objects and thermoplastic polyhydroxyether adhesive composition. The assembly is characterized by an adhesive bond between the termoplastic polyhydroxyether adhesive composition and the object or objects. The term comprehends, therefore, structural elements comprising an adherend such as a substrate and an adhering layer of thermoplastic polyhydroxyether adhesive composition as in a two-ply laminate or a coated substrate; structural elements comprising an interlayer of thermoplastic polyhydroxyether adhesive composition sandwiched between and adhered to two similar or dissimilar adherends or laminae as in a plural ply laminate; structural elements comprising a thermoplastic polyhydroxyether adhesive composition matrix surrounding and adhered to as a bond and/or a support for variously shaped and sized adherends such as articles of varying porosities, e.g., as the bonding agent and/or substrate in "sandpaper" and fiber reinforced plastic articles; structural elements comprising structural members bonded together either closely adjacent or spaced apart by the thermoplastic polyhydroxyether adhesive composition elements and combinations of the foregoing. The adhered preferably is readily wettable by the thermoplastic polyhydroxyether adhesive compositions either because of a surface pretreatment or cleanliness and/or because of its nature i.e. a polar nature such as characterizes metals, glass, and wood and is absent in polyethylene, or for any other reason.

"Nitrile rubbers" herein refers to rubbery, elastomeric copolymers containing at least 50% by weight of a copolymerized conjugated diene having from 4 to 10 carbon atoms inclusive such as hydrocarbon dienes e.g. butadiene, hexadiene, heptadiene, octadiene and nonadiene with at least 2% by weight of a copolymerized alpha substituted acrylic nitrile such as acrylonitrile, chloroacrylonitrile and methacrylonitrile, i.e. acrylic nitriles having the formula

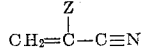

wherein Z is selected from hydrogen, chlorine or methyl. Preferred are copolymers containing 2 to 40% by weight of copolymerized acrylonitrile and preferably 25 to 40% by weight of the copolymerized acrylonitrile, particularly with the balance of the rubber being copolymerized 1,3-butadiene. Acrylonitrile/butadiene copolymers can be prepared by the method disclosed in U.S.P. 1,937,000. The nitrile rubbers used herein can also contain copolymerized termonomers such as methyl acrylate, diallyl phthalate, diallyl maleate, allyl methacrylate and methyl methacrylate and preferably acrylic acid in amounts up to about 10% by weight based on the total weight of the monomers in the polymer. Or, the copolymers can be adducted with unsaturated carboxylic acids.

The term "thermoplastic polyhydroxyether" herein refers to substantially linear polymers having the general formula

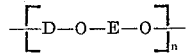

wherein D is the radical residuum of a dihydric phenol, E is an hydroxyl containing radical residuum of an epoxide, and $n$ represents the degree of polymerization and is at least 30 and is preferably 80 or more. Polyhydroxyethers having melt flows of less than about 7.0 determined as hereinafter described are preferred. The term "thermoplastic polyhydroxyether" is intended to include mixtures of at least two thermoplastic polyhydroxyethers.

The dihydric phenol contributing the phenol radical residuum, D, can be either a dihydric mononuclear phenol such as hydroquinone and resorcinol or a dihydric polynuclear phenol such as those having the general formula

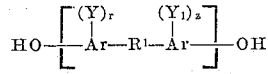

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e. fluorine, chlorine, bromine, and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R_1$ is a bond between adjacent carbon atoms as in dihydroxydiphenyl or is a divalent radical including, for example,

hydrogen radicals such as alkylene, alkylidene, cycloaliphatic, e.g., cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R_1$ can be polyalkoxy, or polysiloxy or two or more alkylidene radicals separated by an aromatic ring, a tertiary amino group, an ether linkage, a carbonyl group or a sulfur containing group such as sulfoxide, and the like.

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane, bis(4-hydroxy-2,6-dimethyl-3-methoxyphenyl)
    methane,
1,1-bis(4-hydroxyphenyl)-ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis-(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclo-hexylmethane,
1,2-bis(4-hydroxyphenyl-1,2-bis(phenyl)propane,
2,2-bis(4-hydroxyphenyl)-1-phenyl-propane and the like;
    Di(hydroxyphenyl)sulfones such as
bis(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as
bis(4-hydroxyphenyl)ether,
the 4,3'-, 4,2'-, 2,2'-, 2,3'-,
dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

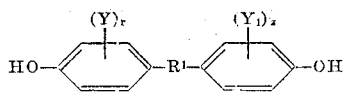

wherein Y and $Y_1$ are as previously defined r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus,

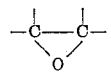

A monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation i.e., $>C=C<$ and acetylenic unsaturation, i.e., $—C\equiv C—$, are preferred. Particularly are halogen substituted saturated monoepoxides, i.e., the epihalohydrins and saturated diepoxides which contain solely carbon, hydrogen and oxygen, especially those wherein the vicinal or adjacent carbon atoms form part of an aliphatic hydrocarbon chain. Oxygen in such diepoxides can be, in addition oxirane oxygen, ether oxygen —O—, oxacarbonyl oxygen

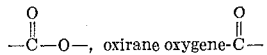

and the like.

Specific examples of monoepoxides include epichlorohydrins such as epichlorohydrin, epibromohydrin, 1,2-expoxy-1-methyl-3-chloropropane, 1-2-epoxy-1-butyl-3-chloropropane, 1-2-epoxy-2-methyl-3-fluoropropane, and the like.

Illustrative diepoxides include diethylene glycol bis(3,4-epoxycyclohexane-carboxylate),
bis(3,4-epoxycyclohexylmethyl) adipate,
bis(3,4-epoxycyclohexylmethyl)phthalate,
6-methyl-3,4-epoxycyclohexylmethyl
    6-methyl-3,4-epoxycyclohexane carboxylate,
2-chloro-3,4-epoxycyclohexylmethyl
    2-chloro-3,4-epoxycyclohexanecarboxylate,
diglycidyl ether,
bis(2,3-epoxcyclopentyl)ether,
1,5-pentanediol bis(6-methyl-3,4-epoxy-
    cyclohexylmethyl)ether,
bis(2,3-epoxy-2-ethylhexyl)adipate,
diglycidyl maleate,
diglycidyl phthalate,
[4.4.0.1$^{7,10}$.0$^{2,4}$]undec-8-yl 2,3-epoxypropyl ether,
bis (2,3-epoxycyclopentyl)sulfone,
bis(3,4-epoxyhexoxypropyl)sulfone,
2,2'-sulfonyldiethyl bis (2,3-epoxycyclopentane-
    carboxylate),
3-oxatetracyclo[4.4.0.1$^{7,10}$.0$^{2,4}$]undec-8-yl
    2,3-epoxybutyrate,
4-pentenal-di(6-methyl-3,4-epoxycyclohexylmethyl)
    acetal,
ethylene glycol bis(9,10-epoxystearate),
diglycidyl carbonate,
bis(2,3-epoxybutylphenyl)2-ethylhexyl phosphate, diepoxydioxane, butadiene dioxide and 2,3-dimethyl butadine dioxide. The preferred diepoxides are those wherein each of the oxirane groups is connected to an electron donating substituent which is not immediately connected to the carbon atoms of that oxirane group.

Such diepoxides have the grouping

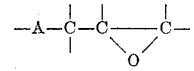

wherein A is an electron donating substituent such as —O—, $$—N—, \; —S—, \; —SO—, \; —SO_2—, \; —\overset{O}{\overset{\|}{C}}—O—, \; or \; —\underset{\underset{Q}{|}}{\underset{SO_2}{|}}{N}—$$
$$\;\;\;|\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;$$
$$\;\;Q$$

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

The thermoplastic polyhydroxyether adhesive compositions of this invention can be prepared by any of the blending or mixing means conventionally used to mix or compound thermoplastics. For example, suitable techniques include codissolving and blending of solutions of the components, working in a Banbury mixer, a compounding extruder, or on a roll mill or in equivalent apparatus. Fluxing the adhesive composition components during a portion of the mixing in these apparatus is preferred to insure homogeneity of the final composition.

Broad ranges of nitrile rubber concentration in polyhydroxyether are suitable. In general, from about 5 parts to about 33 parts or higher up to 50 parts of the nitrile rubber per 100 parts of the polyhydroxyether/nitrile rubber adhesive composition provides substantial reductions in bonding temperature without undue modification of the desirable properties of the polyhydroxyether. Use of from 5 to 20 parts of the nitrile rubber per 100 parts of the polyhydroxyether/nitrile rubber composition is particularly preferred.

The invention is illustrated by the following examples wherein all proportions, parts and percentages are by weight unless otherwise stated. Melt flow of each of the thermoplastic polyhydroxyethers was determined by weighing in grams the amount of polyhydroxyether which, at a temperature of 220° C. and under a pressure of 44 p.s.i., flowed through an orifice having a diameter of 0.825" and a length of 0.315" over a ten minute period. Four such determinations were made and the average of the four determinations is reported as decigrams per minute under a pressure of 44 p.s.i. and at 220° C.

Reduced viscosity herein is defined as the specific viscosity (i.e., the viscosity of the solution minus the viscosity of the solvent divided by the viscosity of the solvent) divided by the concentration of the solution.

*Example 1*

The thermoplastic polyhydroxyether used was prepared by the reaction of equimolar amounts of 2,2-bis(4-hydroxyphenyl)propane and epichlorohydrin together with sodium hydroxide. Equipment used was a two liter, three necked flask provided with a sealed stirrer, thermometer, and reflux condenser. There was placed in the flask:

|  | Grams |
|---|---|
| 2,2-bis(4-hydroxyphenyl)propane, (0.5 mole) | 114.5 |
| Epichlorohydrin (99.1%) pure, (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added to the flask. Heating of the mixture at 80° C. was continued another two hours. There was added to the flask an additional 50 milliliters of the 7:3 toluene:butanol mixture and 4.5 grams of phenol. The contents of the flask were continued heated at 80° C. (reflux) for 2½ hours. Upon cooling, the reaction mixture was cut with 200 milliliters of the 7:3 toluene:butanol mixture. One hundred milliliters of water was added to the flask and agitated with the contents to dissolve salts present in the reaction mixture. The flask contents were allowed to settle for ten minutes during which time a lower brine phase formed. This lower phase was separated by decantation. The upper polymer solution containing phase was washed successively with two 160 milliliters portions of water containing 4.5% butanol. The washed polymer solution was acidified by stirring the solution with a mixture of 1 milliliter of 85% phosphoric acid with 100 milliliters of water (pH=2) for one hour. The upper polymer solution phase was again separated by decantation and water washed with four successive 200 milliliter portions of water containing 4.5% butanol. The washed polymer was then coagulated in one liter of isopropanol, filtered, and dried. There was obtained a thermoplastic polyhydroxyether of 2,2-bis(4-hydroxyphenol) propane and epichlorohydrin having a melt flow of 7.0 decigrams per minute.

A mixture was prepared by milling 87.5 parts of the polyhydroxyether on a two roll mill (365° F. back roll, 330° F. front roll) and slowly adding 12.5 parts of an acrylonitrile-butadiene copolymer containing 33.35% acrylonitrile and containing on the average one carboxyl (COOH) group per 50 carbon atoms. Milling was continued until a uniform milky white mass was obtained. This was sheeted off and pressed into eight mil thick plaques. These were tested for adhesion to aluminum strips which had been cleaned by wiping with acetone and immersing successively for 10 minutes in a solution of 1 part sodium dichromate, 10 parts concentrated sulfuric acid, and 30 parts water at 140–160° F., and rinsing with water. The aluminum strips measured one inch wide by 4 inches long and were Alclad 2024T3 alloy. The ends of the aluminum strips were overlapped over a section of the eight mil thick plaque and bonded at low pressure for 120 seconds between the platens of an electric press heated to 450° C. and quickly cooled. The bonds were tested for lap shear strength in accordance with ASTM D1002. The average lap shear strength for five specimens was 4240 p.s.i.

A control (I) was also run with a polyhydroxyether but without the addition of acrylonitrile-butadiene copolymer. Again bonding was at 450° F. for 120 seconds. Bonds having a lap shear strength of 2450 p.s.i. were obtained.

*Example 2*

Using a polyhydroxyether prepared as in Example 1, a composition was prepared as in Example 1 using per 100 parts of the total, 92.5 parts of the polyhydroxyether and 7.5 parts of the acryonitrile-butadiene copolymer of Example 1. Test specimens were prepared by laminating as in Example 1 at temperatures of 450° C. for 120 seconds. Lap shear strength was 3135 p.s.i.

*Examples 3–4*

Using the polyhydroxyether of Example 1 two compositions were prepared as in Example 1 using per 100 parts of the total of polyhydroxyether and acrylonitrile-butadiene copolymer of Example 1, 5 parts (Example 3), and 10 parts (Example 4) of the acrylonitrile-butadiene copolymer. Test specimens were prepared by laminating as in Example 1 at a temperature of 364° F. and for 15 minutes. Lap shear strength testing was then carried out.

Results were as follows:

| Example | Polyhydroxyether, parts | Acrylonitrile/Butadiene Copolymer of Example 1, parts | Average Lap Shear Strength (p.s.i.) ASTM D-1002 |
|---|---|---|---|
| Control | 100 | 0 | 2,120 |
| 3 | 95 | 5 | 2,440 |
| 4 | 90 | 10 | 3,180 |

*Examples 5 and 6*

The composition of Examples 1 (Example 5) and 2 (Example 6) were extruded into film approximately 1.0 and 0.5 mils thick respectively and lengths thereof were laminated to each of 10 mil stainless steel strips and 23.5 mil cold rolled steel sheets which had been previously degreased and primed with a 0.3-0.5 mil coating of:

| | Parts |
|---|---|
| Synthetic iron oxide | 13.35 |
| Barytes | 14.81 |
| Zinc oxide | 1.46 |
| Polyhydroxyether (melt flow 7.0) | 14.07 |
| Methyl ethyl ketone | 28.17 |
| Methyl Cellosolve acetate | 28.14 | by ironing with a silicone rubber ball. Each coated surface was then heated at 450° F. for 40 seconds and the preheated surfaces laminated together at a pressure of about 35 pounds per square inch in a pair of steel rolls.

One inch wide laminate samples were tested in accordance with ASTM D-903 for peel strength by pulling back the stainless steel lamina at a 180° angle.

The results were as follows:

| Example | Polyhydroxyether, parts | Acrylonitrile/butadiene Copolymer of Example 1, parts | Peel Strength (lbs./in.) ASTM D-903 |
|---|---|---|---|
| Control | 100 | 0 | 13-15 |
| 5 | 87.5 | 12.5 | 31-39 |
| 6 | 92.5 | 7.5 | 27-35 |

*Example 7*

A nitrile rubber containing about 35% copolymerized acrylonitrile and 65% copolymerized butadiene-1,3 was blended on a two-roll mill in ratios of amounts of 5/95 (7A) and 15/85 (7B) with a thermoplastic polyhydroxyether having a melt flow of 6 and the compositions were bonded to aluminum (cleaned as in the preceding examples) at temperatures of 450° F. for 120 seconds followed by rapid cooling.

Results were for lap shear (ASTM D-1005):

| Example | N trile Rubber | Thermoplastic Polyhydroxyether | Lap Shear Strength |
|---|---|---|---|
| Control | 0 | 100 | 2,000 |
| 7A | 5 | 95 | 4,090 |
| 7B | 15 | 85 | 2,740 |

The following are illustrations of the composition and benefits of the invention.

(8) Use the concentrations of Example 1 but use an unmodified acrylonitrile/butadiene copolymer. Equivalent results are obtained.

(9) Vary the acrylonitrile content in the foregoing examples to provide 2, 10, 15, 25, 35 and 40 percent of copolymerized acrylonitrile in the rubber. Equivalent results are obtained.

(10) Substitute methacrylonitrile or chloroacrylonitrile for acrylonitrile in Example 7. Equivalent results are obtained.

(11) Vary the copolymer content in any of the foregoing specific compositions to prepare compositions having 5, 10, 15, 20, 25, 30, 33, 35, 40 and 50 parts of nitrile rubber per 100 parts of the nitrile rubber and polyhydroxyether taken together. Equivalent results are obtained.

(12) Using a polyhydroxyether prepared as in Example 1 but having a melt flow of 6, a series of compositions is prepared as in Example 1 using per 100 parts of the total of polyhydroxyether and methacrylonitrile/nonadiene copolymer, 25 parts (14) and chloronitrile/heptadiene copolymer, 33 parts (14). Test specimens are prepared by laminating as in Example 1 at temperatures of 365° F. and for 60 seconds. Lap shear strength and peel strength are improved.

(15-18) Examples 1 and 8 are each duplicated but substituting for the polyhydroxyether a 6 melt flow poly-(hydroxyether-dihydroxyether) prepared as in Example 1 but with the substitution of 0.25 mole of butadiene dioxide for 0.25 mole of epichlorohydrin (15 and 16) and with substitution of a 6 melt flow polyhydroxyether prepared as in Example 1 but using 0.5 mole of the diglycidyl ether of 2,2-bis(4-hydroxyphenyl)propane for all the epichlorohydrin (17 and 18). An improvement in peel and shear strengths is noted.

What is claimed is:

1. Laminates comprising a substrate and an adhesive composition which develops high bond strengths at relatively low bonding temperatures comprising a mixture of from 50 to 95 parts by weight of thermoplastic polyhydroxyether having the general formula

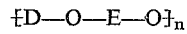

wherein D is the radical residuum of dihydric phenol, E is an hydroxyl containing radical residuum of an epoxide, and $n$ represents the degree of polymerization and is at least 30 and from 5 to 50 parts by weight of a nitrile rubber, containing at least 50% by weight of a copolymerized conjugated diene having from 4 to 10 carbon atoms, with at least 2% by weight of copolymerized alpha substituted acrylic nitrile having the formula

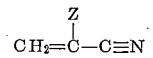

wherein Z is selected from the group consisting of hydrogen, chlorine and methyl, per 100 parts by weight of the mixture.

2. Laminates comprising a substrate and an adhesive composition which develops high bond strengths at relatively low bonding temperatures comprising a mixture of from 80 to 95 parts by weight of thermoplastic polyhydroxyether having the general formula

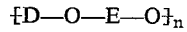

wherein D is the radical residuum of a dihydric phenol, E is an hydroxyl containing radical residuum of an epoxide, and $n$ represents the degree of polymerization and is at least 30 and from 5 to 20 parts by weight of a nitrile rubber, containing at least 50% by weight of a copolymerized conjugated diene having from 4 to 10 carbon atoms, with at least 2% by weight of copolymerized alpha substituted acrylic nitrile having the formula

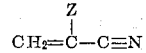

wherein Z is selected from the group consisting of hydrogen, chlorine and methyl, per 100 parts by weight of the mixture.

3. Laminate claimed in claim 2 wherein the thermoplastic polyhydroxyether has a melt flow of less than about 7, and the nitrile rubber is present in an amount of about 5 to 12.5 parts by weight per 100 parts of the mixture.

4. Laminate claimed in claim 1 wherein the nitrile rubber is an acrylonitrile/hydrocarbon diene copolymer.

5. Laminate claimed in claim 1 wherein the nitrile rubber is a methacrylonitrile/hydrocarbon diene copolymer 6. Laminate claimed in claim 1 wherein the nitrile rubber is an chloroacrylonitrile/hydrocarobn diene copolymer.

7. Laminate claimed in claim 4 wherein the hydrocarbon diene is butadiene.

8. Laminate claimed in claim 7 wherein the nitrile rubber contains from 2 to 40 percent by weight copolymerized acrylonitrile.

9. Laminate claimed in claim 7 wherein the nitrile rubber contains from 25 to 40 percent by weight copolymerized acrylonitrile.

10. Laminate claimed in claim 4 wherein the nitrile rubber contains one carboxyl group per 50 carbon atoms.

11. Laminate claimed in claim 10 wherein up to 10 percent by weight of acrylic acid as a termonomer is polymerized with the acrylonitrile and hydrocarbon diene.

12. Laminate claimed in claim 11 wherein the hydrocarbon diene is butadiene.

13. A structural element having improved bond strength comprising at least one steel adherend and at least one stainless steel adherend said adherends being bonded together with an adhesive composition comprising a mixture of from 50 to 95 parts by weight of thermoplastic polyhydroxyether having the formula $$\{D\!-\!O\!-\!E\!-\!O\}_n$$

wherein D is the radical residuum of a dihydric phenol, E is an hydroxyl containing radical residuum of an epoxide, and $n$ represents the degree of polymerization and is at least 30 and from 5 to 50 parts by weight of an acrylonitrile/butadiene copolymer per 100 parts by weight of the mixture.

14. A structural element having improved bond strength comprising at least one steel adherend and at least one stainless steel adherend said adherends being bonded together with an adhesive composition comprising a mixture of from 50 to 95 parts by weight of thermopalstic polyhydroxyether having the general formula $$\{D\!-\!O\!-\!E\!-\!O\}_n$$

wherein D is the radical residuum of a dihydric phenol, E is an hydroxyl containing radical residuum of an epoxide, and $n$ represents the degree of polymerization and is at least 30 and from 5 to 50 parts by weight of an acrylonitrile/butadiene copolymer per 100 parts by weight of the mixture.

15. Method of improving low temperature bonding properties of thermoplastic polyhydroxyether comprising forming a mixture thereof comprising from 5 to 50 parts of a nitrile rubber, containing at least 50% by weight of a copolymerized conjugated diene having from 4 to 10 carbon atoms, with at least 2% by weight of copolymerized alpha substituted acrylic nitrile having the formula $$CH_2\!=\!\underset{\underset{Z}{|}}{C}\!-\!C\!\equiv\!N$$

wherein Z is selected from the group consisting of hydrogen, chlorine and methyl, and from 50 to 95 parts of the polyhydroxyether having the general formula $$\{D\!-\!O\!-\!E\!-\!O\}_n$$

wherein D is the radical residuum of a dihydric phenol, E is an hydroxyl containing radical residuum of an epoxide, and $n$ represents the degree of polymerization and is at least 30, all parts being by weight.

16. Method of improving low temperature bonding properties of thermoplastic polyhydroxyether comprising forming a mixture thereof comprising from 5 to 20 parts of a nitrile rubber, containing at least 50% by weight of a copolymerized conjugated diene having from 4 to 10 carbon atoms, which at least 2% by weight of copolymerized alpha substituted acrylic nitrile having the formula $$CH_2\!=\!\underset{\underset{Z}{|}}{C}\!-\!C\!\equiv\!N$$

wherein Z is selected from the group consisting of hydrogen, chlorine and methyl, and from 80 to 95 parts of the polyhydroxyether having the general formula $$\{D\!-\!O\!-\!E\!-\!O\}_n$$

wherein D is the radical residuum of a dihydric phenol, E is an hydroxyl containing radical residuum of an epoxide, and $n$ represents the degree of polymerization and is at least 30, all parts being by weight.

17. Method of achieving high peel strength bonds between adherends comprising placing between opposing faces of a pair of adherends and adhesive composition comprising a mixture of from 80 to 95 parts by weight of thermoplastic polyhydroxyether having the formula $$\{D\!-\!O\!-\!E\!-\!O\}_n$$

wherein D is the radical residuum of a dihydric phenol, E is an hydroxyl containing radical residuum of an epoxide, and $n$ represents the degree of polymerization and is at least 30 and from 5 to 20 parts by weight of a nitrile rubber, containing at least 50% by weight of a copolymerized conjugated diene having from 4 to 10 carbon atoms, with at least 2% by weight of copolymerized alpha substituted acrylic nitrile having the formula $$CH_2\!=\!\underset{\underset{Z}{|}}{C}\!-\!C\!\equiv\!N$$

wherein Z is selected from the group consisting of hydrogen, chlorine and methyl, maintaining said faces in contact with the adhesive, subjecting the adherend-adhesive-adherend assembly to a temperature sufficient to cause the adhesive to bond and cooling the assembly.

No references cited.

MURRAY TILLMAN, *Primary Examiner.*

P. LIEBERMAN, *Assistant Examiner.*